United States Patent
Gräber et al.

(10) Patent No.: US 6,921,044 B2
(45) Date of Patent: Jul. 26, 2005

(54) WIRE SPOOL AND REMAINING WIRE DETECTION METHOD

(75) Inventors: Jochen Gräber, Bissingen (DE); Mario Litsche, Backnang (DE); Wolfgang Recht, Backnang (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 105 days.

(21) Appl. No.: 10/673,304

(22) Filed: Sep. 29, 2003

(65) Prior Publication Data

US 2004/0113009 A1 Jun. 17, 2004

(30) Foreign Application Priority Data

Oct. 2, 2002 (DE) .......................... 102 46 075

(51) Int. Cl.[7] .............................................. B65H 26/06
(52) U.S. Cl. ................... 242/563.2; 242/580; 242/583; 242/476.1; 242/912
(58) Field of Search ............................ 242/364.8, 563, 242/563.2, 580, 581, 583, 476.1, 125.1, 912; 200/61.15

(56) References Cited

U.S. PATENT DOCUMENTS 4,676,442 A  6/1987  Tholander et al.

FOREIGN PATENT DOCUMENTS

| CA | 1 270 502 | 6/1990 |
|----|-----------|--------|
| DE | 40 21 744 A1 | 1/1992 |
| DE | 91 15 063.9 | 5/1993 |
| DE | 94 01 503.1 | 6/1994 |
| EP | 0 615 942 B1 | 9/1994 |
| JP | 60015360 | 1/1985 |

OTHER PUBLICATIONS esp@cenet abstract for DE 4021744.
esp@cenet abstract for EP 0615942.
esp@cenet abstract for JP 60015360.
Concise explanation of DE 9115063 U and DE9401503 U, (Abstracts only).
DE Search Report for 102 46 075.2.

Primary Examiner—John Q. Nguyen
(74) Attorney, Agent, or Firm—Laurence A. Greenberg; Werner H. Stemer; Ralph E. Locher

(57) ABSTRACT

A wire spool for remaining wire recognition for wire (1) with a leading wire end (4) and a trailing wire end (2), which is wound on the spool body (30, 40) in N windings, whereby the spool body (30, 40) has side walls (40) on both sides and a spool drum (30), with a magnet (10) that is fastened in the spool body (30, 40), whereby the installation position of the magnet (10) in the spool body (30, 40) is such that the magnetic field lines (11, 12) are arranged along the magnet (10) essentially parallel to the winding direction of the wire (1) on the spool drum (30).

9 Claims, 4 Drawing Sheets

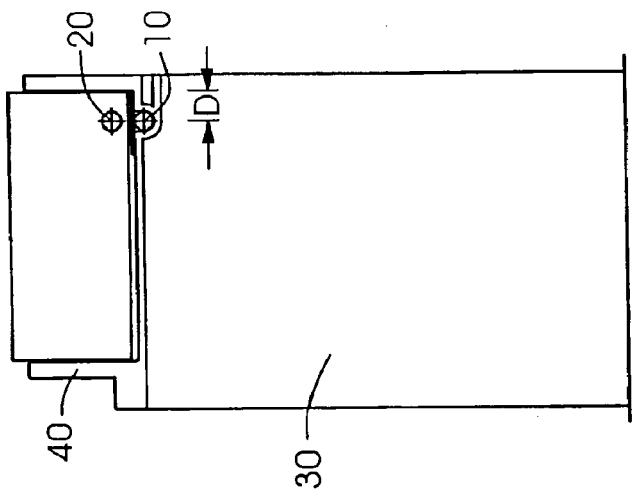
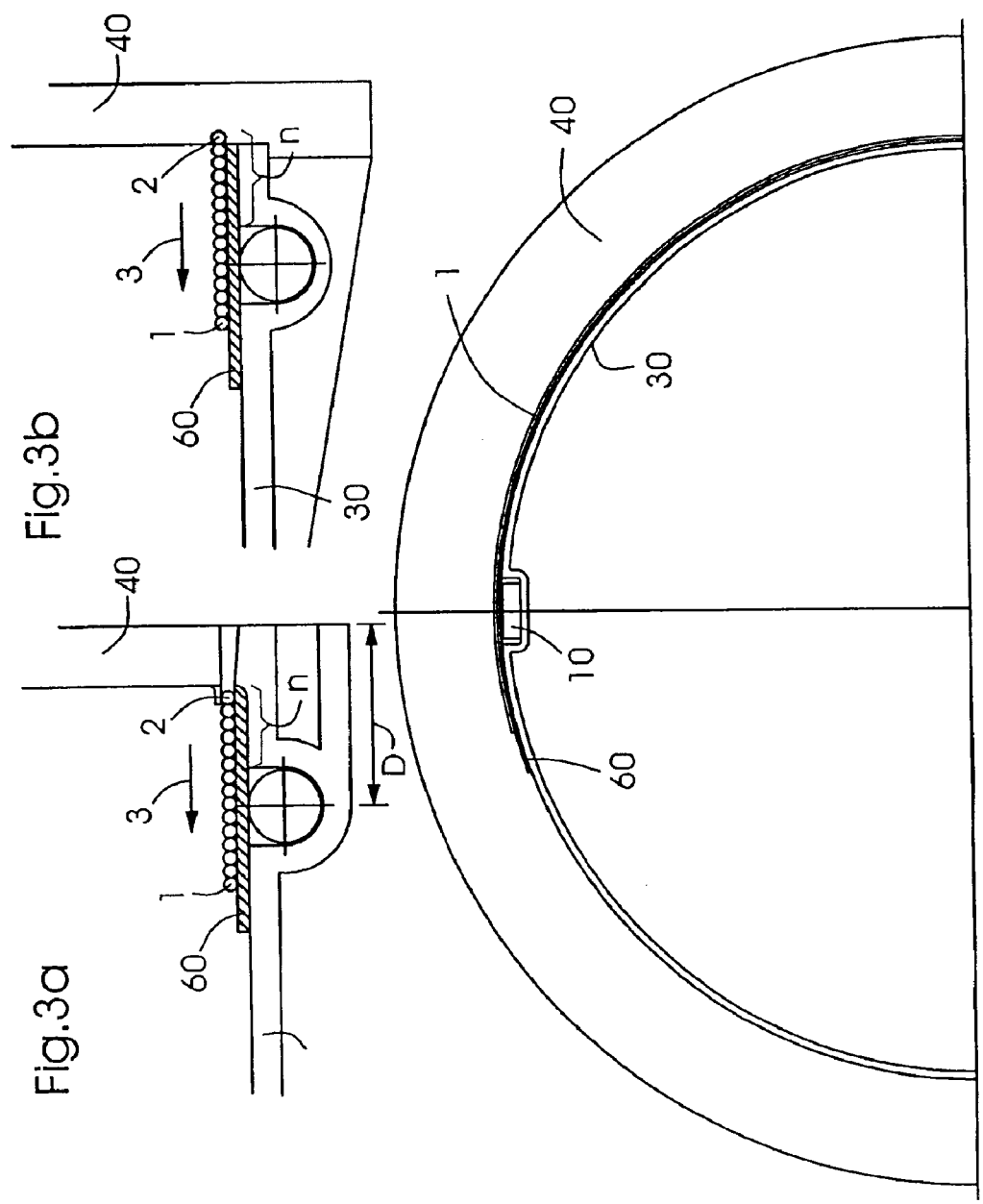

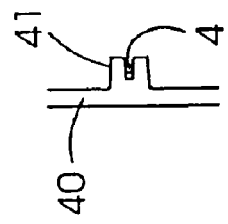
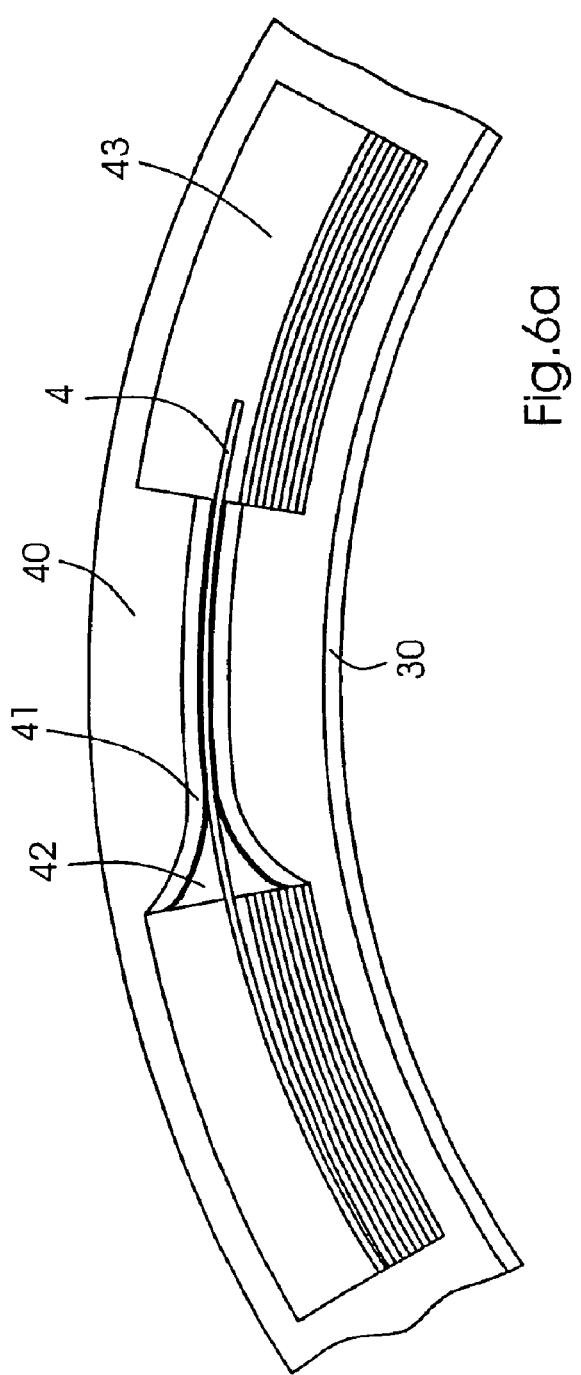
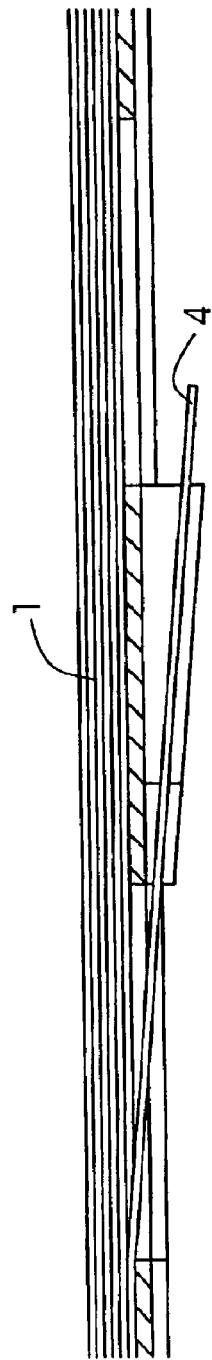

WIRE SPOOL AND REMAINING WIRE DETECTION METHOD

FIELD OF THE INVENTION

The present invention relates to a device for storing wire and in particular a wire spool having a magnet for detecting the end of the wire as it is unspooled.

BACKGROUND

Devices are known that wire available to a wire-working machine, e.g. a device that produces wire comb binding elements for binding stacks of sheet-shaped materials.

In such devices that fabricate workpieces or semi-finished products of wire or use welding wire, the wire is drawn from a wire spool. A user of such a device can frequently only recognize the fact that the wire is approaching the end by glancing at the wire spool. In some applications, these spools are either poorly accessible or there are a large number of spools so that it is complicated for the user to manually check the fill level of the wire spool.

Visual inspection does not however, provide the user with accurate information on how many meters of wire still remain on the wire spool and for how many welds, workpieces or semi-finished products the wire will be adequate.

Devices for detecting spooled wire typically use electrically resistive methods in which current is conducted through the wire by means of a contact to determine the length of the wire based on the resistance of the wire that can be measured in this process. These devices are not useful though for wire coated with plastic as is frequently used for wire comb binding elements.

Other devices use optical means in order to determine the remaining quantity of wire. Such methods are typically susceptible to soiling and in addition require to some extent complicated and thus expensive optics.

Serious damage can occur to machinery utilizing the wire if the wire is allowed to run out while the machine is still running. Also, premature changing of the wire spool wastes wire.

Canadian patent CA 1 270 502 discloses a magnet inserted in a spool body which is in active relationship with a magnetic sensor that is mounted outside the spool wall and is opposite the magnet once at each rotation of the spool. The magnetizing of the magnet is such that the magnetic field lines through the cable windings are guided above the magnet, i.e. at a right angle to the winding direction of the cable on the cable drum. The continuous conduction of the magnetic field lines, i.e. of the magnetic flux through the adjacent cable windings, functions especially well if the cable is not coated. Between the magnet and the magnet sensor, flush with the magnet, an intermediate element is embedded in the spool body, this element being made of a material that has permeability that is lower than that of the cable. If no cable is now located above the magnet, the magnetic field lines are conducted through this intermediate element in the area of the magnet sensor so that it generates a signal. This signal correlates with the absence of cable and can, therefore, be evaluated as information that only a specified number of windings remain on the wire spool.

Japanese publication JP 60015360 discloses a device for remaining wire quantity recognition for welding wire, which also uses a magnetic principle. In this process, a magnetic proximity switch and a permanent magnet are mounted on a movable contact arm. The contact arm remains in contact, by way of an insulating element, with the wire; when wire is present a signal is caused in the magnet sensor because of the permanent magnet. As soon as no more wire is present, the magnet sensor switches off so that a signal is generated to indicate that only a little wire is left on the wire spool. Efforts to improve such systems have led to continuing developments.

BRIEF DESCRIPTION OF THE DRAWINGS

FIG. 2a is a schematic representation of the upper half of the wire spool according to the invention in top view.

FIG. 2b is a schematic representation of the top half of the wire spool according to the invention in side view.

FIG. 3a is an enlarged schematic detailed view of the area around the magnet in the wire spool according to the invention in a first embodiment.

FIG. 3b is an enlarged schematic detailed view of the area around the magnet in a wire spool according to the invention in a second embodiment.

FIG. 6a is a schematic top view of a leading wire end fastening in the side wall of the spool.

FIG. 6b is a schematic side view in wire direction of a leading wire end fastening in the side wall of the spool.

FIG. 6c is an enlarged schematic side view in wire direction of a leading wire end holding device in the side wall of the spool.

DETAILED DESCRIPTION

Figure 1B:
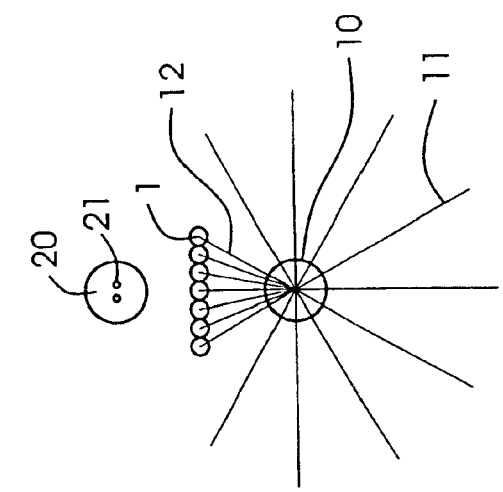
FIG. 1b is a schematic front view of the magnetic field of the magnet when wire is present.
Figure 1D:
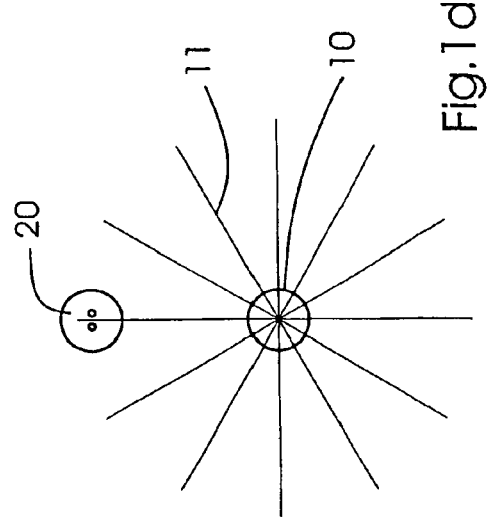
FIG. 1d is a schematic front view of the magnetic field of the magnet when wire is absent.
Figure 1A:
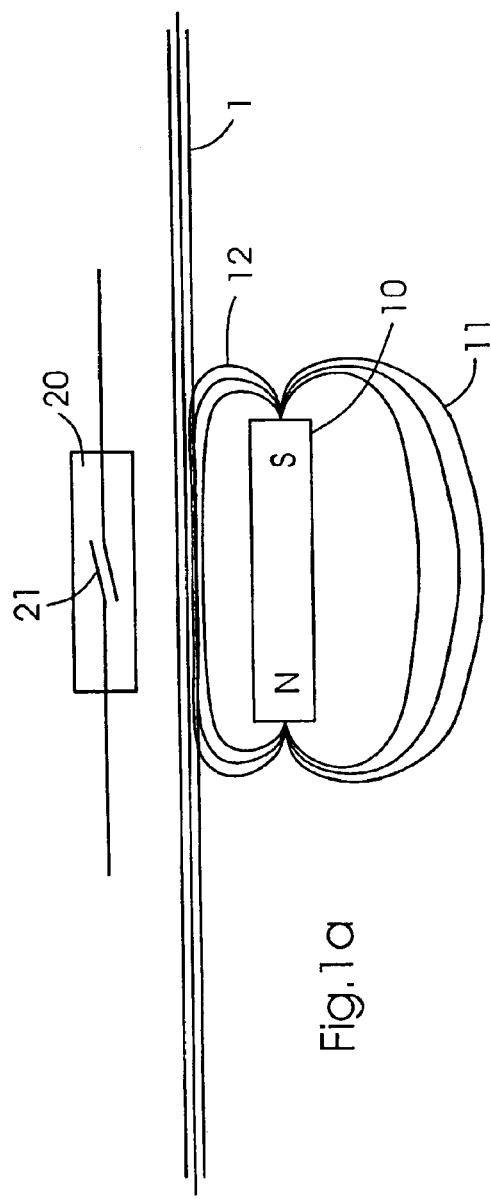
FIG. 1a is a schematic side view of the magnetic field of the magnet when wire is present.

FIGS. 1a and 1b show the principle of shielding of magnetic field lines 11, 12 of the bar magnet 10 by the wire 1. The bar magnet 10 may be a bar magnet that has its magnetic poles at the ends of the bar and, for example, has a cylindrical shape. A cylindrical bar magnet with this type of magnetizing generates a more homogeneous magnetic field in the circumference direction in comparison to square bar magnets. The diameter of the bar magnet may be selected in such a way that it is three to ten times the wire diameter, e.g a wire diameter of 1 mm, a cylindrical bar magnet with a diameter of 5 mm. Normally the magnetic field extends radially in all directions, whereby the magnetic field lines 11, 12 run essentially parallel to the alignment of the bar magnet 10 but in the area where the magnetic field lines 12 get into the area of the ferromagnetic wire 1, the magnetic field lines 12 run within the wire 1 and the magnetic field is shielded on the other side of the wire windings of wire 1. Therefore, a reed relay 20 mounted there does not respond. A reed relay 20 is a switch that comprises two closely adjacent filaments 21 that pull up simultaneously in the presence of a magnetic field and thereby make a circuit. However, other sensors such as a Hall probe can be used as a sensor for the magnetic field.

Figure 1C:
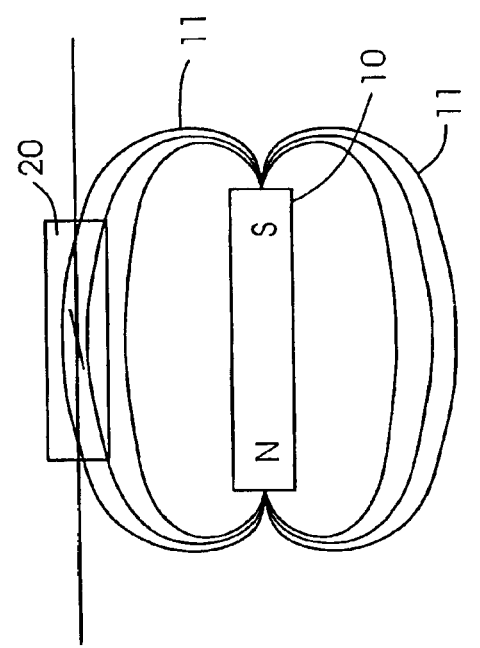
FIG. 1c is a schematic side view of the magnetic field of the magnet when wire is absent.

If now, as in FIGS. 1c and 1d, wire 1 is removed from the intermediate space between the reed relay 20 and the bar magnet 10, i.e. unwound far enough from the spool drum 30 that the wire windings no longer cover the bar magnet 10 or only cover it partially, the shielding effect of wire 1 is eliminated and reed relay 20 switches closed.

Because of the fact that the magnetizing of the bar magnet is essentially parallel to the winding direction of the wire windings, a single wire winding covers a considerable area of the bar magnet outward. If a magnet sensor is mounted with respect to the bar magnet in such a way that the wire windings lie between the magnet sensor and the bar magnet, a considerable percentage of the magnetic field emitted from the bar magnet will be shielded by a single wire winding. Typically, the wire spool is rotated and in this process the wire is drawn off tangentially. In this case, the magnet and the magnet sensor meet once per revolution. The magnet sensor, e.g. a reed relay, is thus able to respond with a precision ranging from one to two wire windings on the wire spool. With a wire spool diameter of approx. 30 cm, this corresponds to a precision of 1 to 2 meters wire.

FIGS. 2a and 2b show the relevant section of an embodiment of the wire spool according to the invention. In order to clarify the structure of the wire spool, only sections of wire 1 are shown, wire 1 is naturally looped in complete windings around the wire drum 30. The bar magnet 10 is fastened in a recess in the spool body 30, 40 so that its cylinder shroud contacts the surface of the spool drum 30 as closely as possible and the bar magnet 10 is at a specific distance D from one of the spool walls 40. The wire spool is used in a device so that the magnet sensor 20 provided in this device is essentially at the same distance D from the spool wall 40, whereby the bar magnet 10 and magnet sensor are essentially parallel to each other and essentially parallel to the wire windings and essentially parallel to the magnetic field lines 11, 12 along the bar magnet 10.

As can be seen in FIGS. 3a and 3b, a double-sided adhesive tape 60 is applied above bar magnet 10 on the spool drum 30, by means of which the first wire windings are fastened on the spool drum 30, winding against winding. There are n windings between the bar magnet 10 and the spool wall 40. These n windings of wire 1 remain on the spool drum 30 after response of a magnet sensor 20 as soon as the other windings have been unwound again. To do this, depending on the dimensioning of the bar magnet 10, the distance from the magnet sensor 20, magnetizing of the bar magnet, the response threshold of the magnet sensor 20 and other influences, there can be a few additional windings that in fact still cover the bar magnet 10 but in spite of this the magnet sensor has already responded. However, the number of these additional windings can be calculated as soon as the above-mentioned parameters are specified and do not contribute to imprecision in determining the remaining wire quantity.

The wire end 2 can be fastened on the spool drum 30 or the spool wall 40 using different mechanisms, e.g. by a lip extending inward out of the spool wall 40 (FIG. 3a) or in a recess within the spool wall 40 (FIG. 3b). After the fastening of the trailing wire end 2 on the wire spool, winding against winding of the wire 1 are laid down on the adhesive tape 60 in the filling direction marked with arrow 3.

Figure 4:
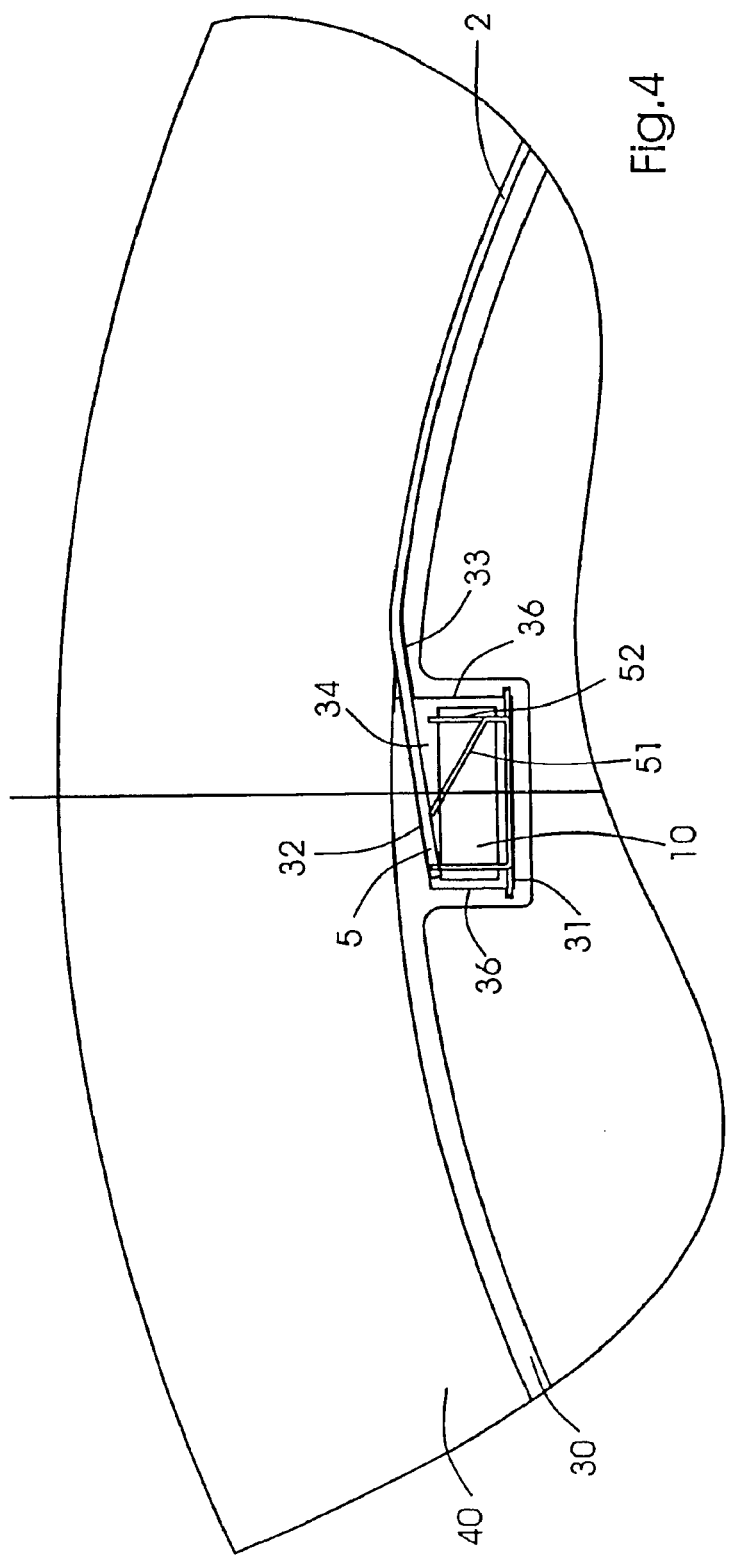
FIG. 4 is a schematic detailed view of the area around the magnet in the wire spool according to the invention with holding device for the magnet and the trailing wire end.
Figure 5B:
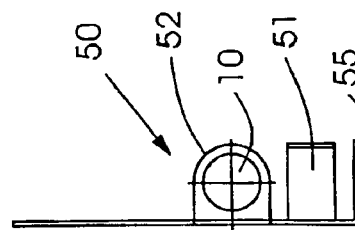
FIG. 5b is a schematic side view of the holding device for the magnet and the trailing wire end.
Figure 5A:
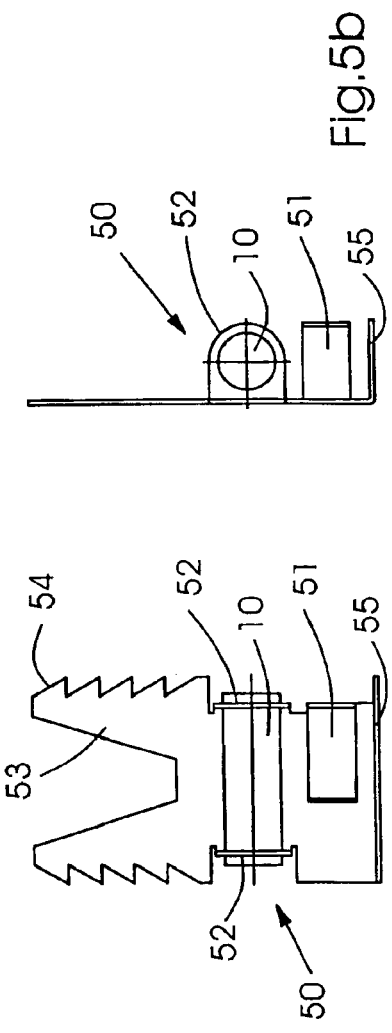
FIG. 5a is a schematic top view of the holding device for the magnet and the trailing wire end.

Another fastening mechanism for the wire end 2 is shown in FIG. 4. In this case, as shown in detail in FIGS. 5a and 5b the magnet mount 50 is inserted laterally in the spool body 30 and the leading wire end 2 is inserted along a insert slope 33 into a recess 34 in the area of the magnet mount 50 and pressed by a spring loaded locking element 51 against an angled ceiling 32 of recess 34 that is flush with the insert slope, offset by the thickness of the wire. The latching element 51 forms a retainer on the trailing wire end 2 so that the trailing wire end 2 that has just been inserted cannot be removed from recess 34 without damage. The latching element 51 may also be provided in one embodiment with a specified breaking point that leads to damage of the locking element 51 if the trailing wire end is pulled out of the holding device with a specific force. The bursting or breakage of the locking element 51 makes an audible acoustic signal that no more wire 1 is available on the wire spool so that the user of a wire-processing device still has an opportunity to interrupt the wire transport. The specified breaking point in the locking element can also protect other machine parts, especially the suspension of the wire spool and possibly also its drive.

The magnet mount 50 has a carrier plate 53 of spring band steel with locking teeth 54 that is inserted into the spool body 30. Locking teeth 54 which lock with the spool body 30, 40 may be made of plastic thus preventing a change in the position of the magnet 10 in the spool body 30, 40, which otherwise would lead to an imprecision during remaining wire recognition. In addition, the carrier plate 53 is bent to a closing plate 55 at its other end, which closes the recess 34 toward the outside.

FIGS. 6a, 6b and 6c show details of the fastening of the leading wire end 4. The spool wall 40 has, on the side turned toward the user, several passages 43 are distributed on the circumference. Between the passages there are two conical gripping guides 41 that make it possible to grip the leading wire end 4 in them. In the front area of the gripping guides 41, a flat threading aid 42 is provided, on the side of which the gripping guides come together. Between the gripping guides, undercuts that are not shown are formed, behind which the wire must snap during clamping. Because of this, the user receives a tactile feedback when the leading wire end has been securely clamped. In this way, the leading wire end 4 can be stretched tightly and remain straight so that during a wire spool change a straight leading wire end 4 is made available to the user which can be more easily inserted into the wire-working device.

The present invention provides a wire spool with which a remaining wire quantity determination that is as precise as possible can be carried out with the cooperation of an external magnet sensor, especially with the use of coated wire.

Accordingly a wire spool for remaining wire recognition is provided for wire that has a wire start and a wire end and is wound on the spool element in n windings, whereby the spool body has side walls on both sides and a spool drum and a magnet that is fastened in the spool body, whereby the installation position of the magnet in the spool body is such that the magnetic field lines along the magnet are arranged essentially parallel to the winding direction of the wire on the wire spool.

The magnet is at a distance from the spool wall such that a specific number of wire windings n will remain on the spool drum as soon as all windings have been unwound over the magnet. This number n of remaining windings, multiplied by the circumference of the wire spool, corresponds to exactly the remaining wire length on the wire spool. This information has the above-mentioned error of one to two wire windings. However, this error is absolute and becomes relative with increasing number n of remaining wire windings. The control of a wire-working device can use this information regarding the remaining wire length in order to estimate how many more workpieces or semi-finished products can be finished and can inform the user of the wire-working device of this. The number n of the remaining wire windings can be adjusted to the application of the wire-working device; however, it must always be at least high enough so that the order in which the wire-working device uses the most wire can still be completed.

In another embodiment the first windings on the spool drum lie close to each other and/or are fastened loosely by an adhesive element. Because of this, it can be ensured that the number of wire windings assumed between the magnet and the trailing wire end is actually present. The use of double-sided adhesive tape improves the winding and makes it easier. In addition, the double-sided adhesive tape ensures that during unwinding the last windings actually remain winding against winding and the shielding of the magnet by the wire is not lost prematurely. Loose fastening is understood in this context to mean that the wire windings in fact adhere to the double-sided adhesive tape, but with a force such that the wire can be drawn from the wire spool effortlessly and without deformation.

In addition to a double-sided adhesive tape, alternative fastening methods from the state of the art are applicable which permit a corresponding loose fastening of the wire windings.

In another embodiment the device also comprises a magnet mount that can be inserted and by means of which the magnet is positioned in the wire spool. In this way, a simple and economical type of assembly of the wire spool according to the invention can be implemented and, at the same time, great precision in the positioning of the bar magnets can be ensured.

In another embodiment the magnet mount has latching hooks that clamp together with the spool body. In this way, the magnet cannot move from its intended position in relationship to the spool wall during rotation of the wire spool or simply fall out again.

Because of this, it can especially be ensured that the number n of remaining wire windings between bar magnet and spool wall actually corresponds to the planned number n of remaining wire windings.

In another embodiment, the wire spool has holding devices for a straight trailing wire end and/or straight leading wire end. In the state of the art, it has usually only been possible to date to bend the trailing wire end fastened on the spool body in order to fasten it on the spool body before winding the wire spool. Also, usually with a spool that has been partially wound, but is then replaced and stored, the free leading wire end is bent over in order to prevent the wire winding to at least partially unwind by itself because of its internal tension. A reason for a replacement of spools such as this is, for example, a change in wire color or other wire parameters without the wire spool having been completely used up, say due to a change in orders. However, bending of the leading wire end has a negative effect on further processing if the wire spool is used again. The wire-working device will generally not accept any leading wire end that has been bent over or bent back, so the user has to have a tool in order to remove the bent leading wire end, e.g. cutting pliers. When there is a holding device for the leading wire end on the spool in which the leading wire end is not bent, this is not necessary. A straight trailing wire end has the simple advantage that the trailing wire end does not have to be additionally bent.

In another embodiment the wire spool has a holding device for a straight trailing wire end, whereby the holding device has a locking element that prevents the trailing wire end from pulling out of the holding device. Because of this, it is easy to achieve attachment of the trailing wire end after it is simply inserted and the following windings are stressed and winding against winding can be wound. The opening for insertion of the trailing wire end has an insertion diagonal in order, on one hand, to make the insertion easier and on the other, to maintain a trailing wire end that is as unbent as possible. In an embodiment, the locking element has a specified breaking point so that with a certain tension that is applied when the wire is removed from the wire spool and which exceeds the tension for ideal unwinding, the locking element is destroyed and the trailing wire end is released. In this way, the wire can be completely unwound from the wire spool. In addition, this prevents the wire-working device from unintentionally tearing the wire spool out of the mount or other damage from occurring, say in the wire guide. The material used for the holding device may be spring band steel or other suitable material.

In another embodiment the wire spool has holding devices for a straight leading wire end, hereby there are a number of holding devices present on the circumference. In this way, t can be ensured that only a small straight wire piece extends from the next holding device for the leading wire end at all times. On one hand, this has the advantage that the danger of injury is decreased; on the other hand, it increases the probability that the straight leading wire end can easily be threaded back into the wire-working device when the wire spool is used again and will not be damaged during storage, e.g. bent. The holding devices may be conical gripping guides that face forward on the spool edge, between which the leading wire end is gripped over a fairly long distance. In an embodiment, undercuts are formed between the gripping guides behind which the wire must snap when it is clamped. Because of this, the user receives tactile feedback of whether the leading wire end has been clamped securely. In addition, the clamping of the leading wire end can be further improved by a measure of this type. However, alternatively a large number of other holding device mechanisms can be used that are known to the person skilled in the art.

In another embodiment, the wire spool is used in a device for flexible manufacturing of wire comb binding elements, whereby the wire comb binding elements are produced with different parameters like loop length and number of loops. It is beneficial to know whether there is still enough wire available for the next wire binding element to be produced, or not, since the wire binding elements can differ considerably in their size and thus in the amount of wire required.

In addition, the inventive concept includes a method for remaining wire recognition of wire on a spool body with these steps: provision of a wire spool according to the invention, provision of a magnet sensor in active relationship with the magnet in the spool body; detection of an electrical signal by the magnet sensor as a response to the absence of wire between the magnet sensor and the magnet; signaling the remaining wire windings on the wire spool to higher-level electronics.

The magnet sensor is especially a reed relay; alternatively a Hall probe or a comparable mechanism can be used. Because of this method, it is now possible to precisely determine the remaining wire quantity on the wire spool to about one to two wire windings in a device that has a holding location for a wire spool according to the invention and has a corresponding magnet sensor. With a wire spool with a circumference of approx. 1 m, this means that the remaining wire quantity can be precisely detected to about 1 to 2 meters at the moment in which the wire spool has been unwound down to n windings. A suitable control can determine the entire length of the remaining wire from this as soon as it has received the signal from the magnet sensor and can use this information to report to a user how many workpieces or semi-finished products can still be produced with the remaining wire on the wire spool. This is a remaining wire length that is in any case still adequate in order to complete the workpiece or semi-finished product that has been started to produce one or two more workpieces or semi-finished products. This is advantageous if the higher-level control knows how much wire the following workpieces or semi-finished products require, especially if the wire quantity varies from one workpiece or semi-finished product to the next. The higher-level control signals the user of the wire-working device of the approaching trailing wire end, acoustically, on a user interface, visually or by other mechanisms known to the person skilled in the art.

Although the invention has been shown and described with exemplary embodiments thereof, it should be understood by those skilled in the art that the foregoing and various other changes, omissions and additions may be made therein and thereto without departing from the spirit and scope of the invention. For instance, other magnets, such as an electromagnet with appropriate energy supply may be used with the present invention.

What is claimed is:

1. An apparatus for spooling wire with a leading wire end and a trailing wire end comprising:
   a spool body about which the wire is wound in N windings, the spool body having a spool drum and side walls on both sides; and
   a magnet disposed in the spool body such that the magnetic field lines of the magnet are arranged along the magnet essentially parallel to the winding direction of the wire on the spool drum.

2. An apparatus according to claim 1, wherein the magnet is a distance to one spool wall such that a specific number of wire windings n remain on the spool drum when no windings remain over the magnet.

3. An apparatus according to claim 1, wherein the first n windings are fastened with an adhesive element.

4. An apparatus according to claim 1 further comprising a plug-in magnet mount for mounting the magnet in the wire spool.

5. An apparatus according to claim 4, wherein the magnet has latching hooks that engage with the spool body.

6. An apparatus according to claim 1 further comprising a holding device for a straight trailing wire end or a straight leading wire end.

7. An apparatus according to claim 1 further comprising a holding device for a straight trailing wire end, whereby the holding device has a locking element that prevents the trailing wire end from pulling out of the holding device.

8. An apparatus according to claim 1 further comprising holding devices for a straight leading wire end, whereby the holding devices are present in a number of places on the circumference of the spool walls.

9. A method for detecting wire spooled on a drum comprising the steps of:
   arranging magnetic field lines of a magnet essentially parallel to the winding direction of the wire;
   detecting via a magnet sensor the absence of wire between the magnet sensor and the magnet.

* * * * *